(12) United States Patent
Gardiner et al.

(10) Patent No.: US 8,593,534 B2
(45) Date of Patent: Nov. 26, 2013

(54) AUTO-TRIGGERED CAMERA SELF-TIMER BASED ON RECOGNITION OF SUBJECT'S PRESENCE IN SCENE

(75) Inventors: Koji Gardiner, San Francisco, CA (US);
E-Cheng Chang, San Jose, CA (US);
Jason Rukes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 12/877,724

(22) Filed: Sep. 8, 2010

(65) Prior Publication Data

US 2012/0057039 A1    Mar. 8, 2012

(51) Int. Cl.
*H04N 5/225* (2006.01)

(52) U.S. Cl.
USPC .................. 348/211.11; 348/273; 348/333.12

(58) Field of Classification Search
USPC ............... 348/222.1, 333.01, 333.02, 333.11, 348/333.12, 211.11, 211.13, 273–275; 382/115
See application file for complete search history.

(56) References Cited

U.S. PATENT DOCUMENTS

| | | | |
|---|---|---|---|
| 7,945,076 B2 * | 5/2011 | Delean | 382/118 |
| 2007/0177023 A1 * | 8/2007 | Beuhler et al. | 348/211.3 |
| 2007/0274703 A1 | 11/2007 | Matsuda | |
| 2008/0122943 A1 | 5/2008 | Itoh | |
| 2009/0027513 A1 | 1/2009 | Sako | |
| 2009/0097713 A1 * | 4/2009 | DeLean | 382/115 |

* cited by examiner

*Primary Examiner* — Tuan Ho
(74) *Attorney, Agent, or Firm* — Fish & Richardson P.C.

(57) ABSTRACT

An automated image capture mode of a camera in an electronic device insures that a particular subject appears in the captured image. An image of the particular subject, which may be the photographer, is initially captured. Subsequently, another image capture is automatically triggered when the same subject is detected within the camera's field of view. In one embodiment, a motion sensor within the device may be employed to begin a search for the subject, when the camera is subjected to a sudden movement. Other embodiments are also described and claimed.

14 Claims, 4 Drawing Sheets

AUTO-TRIGGERED CAMERA SELF-TIMER BASED ON RECOGNITION OF SUBJECT'S PRESENCE IN SCENE

BACKGROUND

1. Field

The invention relates generally to the field of photography and, more particularly, to an automated process for capturing an image that includes a particular person, such as the photographer.

2. Background

It is a common desire of photographers to be included in scenes that they photograph. A frequently used solution is to enlist the aid of another individual to take the photograph. This, of course, is not always a feasible or convenient solution. Most cameras are equipped with self-timers that delay the shutter release for some period of time so that the photographer can position the camera on a stable surface and then move into the camera's field of view. Additionally, some cameras are equipped with a remote control so that the photographer can trigger the shutter release after taking a desired position in front of the camera. Another common solution that is frequently used with small handheld cameras is for the photographer to hold the camera in an outstretched arm with the camera lens pointed in the direction of the photographer. This approach is often unsuccessful since the camera's viewfinder is typically not visible from the front of the camera and numerous attempts may be required before an image is captured without the photographer's face being cropped out of the scene.

SUMMARY

An embodiment of the present invention provides a camera with an automated image capture mode for insuring that a particular subject appears in the captured image. An image of the particular subject, which may be the photographer, is initially captured. Subsequently, another image capture is automatically triggered when the same person is detected within the camera's field of view.

In another embodiment of the invention, a motion sensor within the camera is employed to begin a search for the person whose image was previously stored, when the camera is subjected to a sudden movement.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Figure 1:
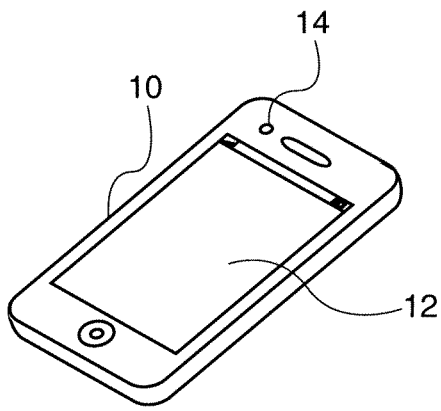
FIG. 1 illustrates a camera device in which embodiments of the present invention may be practiced.
Figure 2:
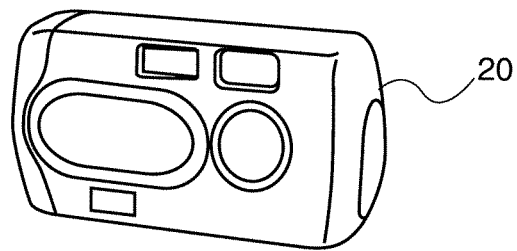
FIG. 2 illustrates another camera device in which embodiments of the present invention may be practiced.

FIG. 1 illustrates a portable camera device 10 in which embodiments of the present invention may be practiced. The device 10 may be any one of several different types of small consumer electronic devices that can be easily held in the user's hands during normal use. In particular, device 10 may be a multi-function smart phone device such as an iPhone™ device by Apple Inc. The device 10 in this case has an exterior front face in which there is a display screen 12 and an imaging lens 16 of a front-facing camera 14 (also referred to as a front camera or a camera that is aimed out of the front face). A second, rear-facing camera (not shown) may also be included whose imaging lens faces out of the exterior rear or back face of the housing of the device 10. In one embodiment, the front camera 14 is a lesser performing camera (e.g., has lower image sensor pixel resolution) than the rear camera, and the rear face of the housing of the device 10 has no display screen. Embodiments of the present invention may also be practiced in a dedicated personal digital camera device 20 illustrated in FIG. 2 which may have an optical viewfinder and in other camera devices, including a tablet-like computer such as an iPad™ device by Apple Inc., a notebook personal computer or a desktop personal computer, all of which may have a built-in digital camera.

Figure 3:
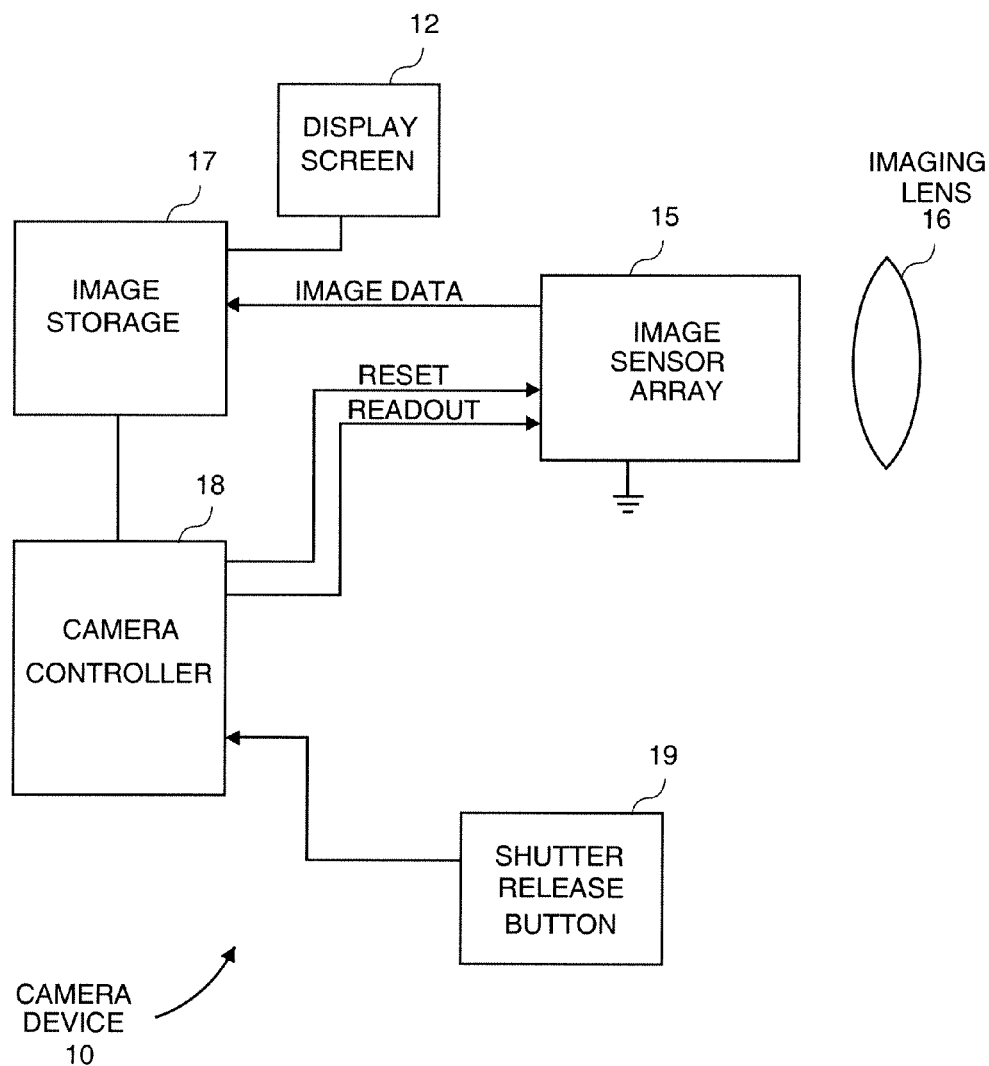
FIG. 3 is a functional block diagram of a camera device in which embodiments of the present invention may be practiced.

A combined circuit schematic and block diagram of some relevant constituent electronic components of a portable camera device 10 (also applicable to camera device 20) is presented in FIG. 3. The digital camera functionality is obtained using a microelectronic image sensor array 15 on which light from the scene to be captured has been gathered by the imaging lens 16. A mechanical shutter (not shown) may be included in front of the sensor array 15 to control the duration of exposure. Alternatively, an entirely electronic shutter may be implemented using the sensor array's reset and readout signals. The sensor array 15 responds to the incident light and collects photo-generated charge or forms image signals during an integration interval (or exposure interval) defined by the reset and readout signals. At the end of the integration interval, the image signals are read (including being digitized) and transferred as a captured digital image or "exposure" to image storage 17. This may be a "final" image or picture of the scene, which may be stored in a removable, user picture storage area (e.g., a removable nonvolatile memory card.) The image storage 17 may include sufficient non-volatile memory suitable to store many digital images captured by the sensor array 15.

A camera controller 18 (e.g., implemented as a combination of programmed data processing components and hard-wired logic circuitry) manages the process of capturing images. It does so by generating various commands that are signaled to the components of the camera device 10, in response to a user of the device 10 actuating a shutter release button 19, to take an exposure. The button 19 may be a physical button on an outside surface of the housing of the device 10, or it may be a virtual button displayed on a touch screen of the device 10. The camera may also include a digital viewfinder function that is also conducted by the controller 18. The digital viewfinder function lets the user see a lower resolution version of the just-captured image on the display screen 12. The digital viewfinder function may also produce live video of the scene using a selected camera of the device 10; the user can thus preview the scene before actuating the shutter release button to take a picture.

In the case of a camera device 10 having both a front facing camera and a rear facing camera, the controller 18 may be further coupled to a second, different image sensor array via separate reset and readout signal lines. The second array would also be coupled to share the image storage 17 and display screen 12. A different imaging lens would also be provided for gathering light onto the second sensor array, where the latter combination could be aimed at a substantially opposite direction as the array 15 and imaging lens 16.

Figure 4:
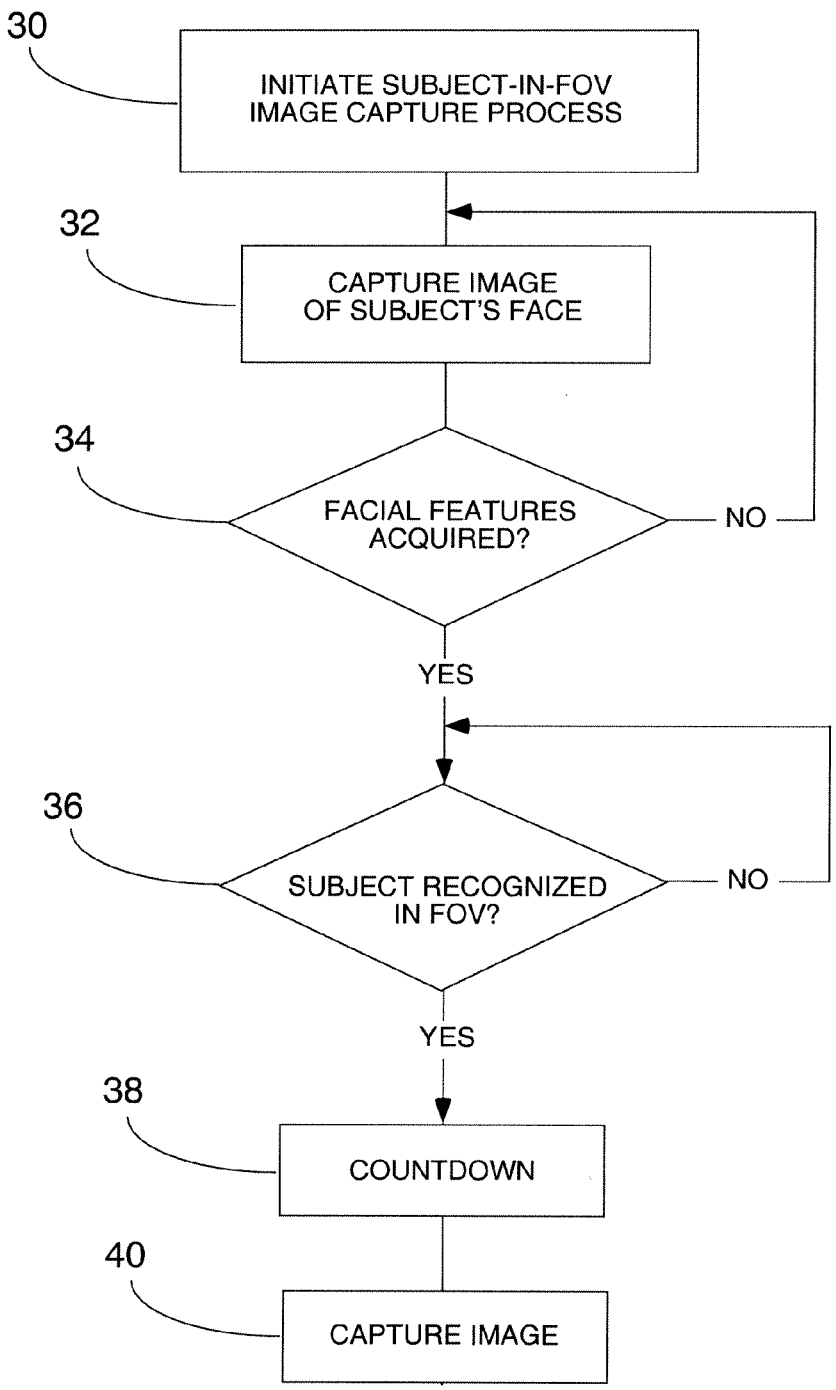
FIG. 4 is a functional flow diagram of an image capture process in accordance with an embodiment of the present invention.

A process for implementing an embodiment of the present invention is shown in FIG. 4. This process may also be conducted by the controller 18, within the arrangement of FIG. 3 for instance. The process begins with user selection of the automated image capture process at 30. This may be accomplished with a menu selection, by launching a special purpose application, by depressing a manual switch or by other means known to those skilled in the art. An image of the subject is then captured at 32. The subject may be the user of the camera, but could be any other person that the camera user wishes to include in a subsequently captured image. In the case of a device having both front-facing and rear-facing cameras, such as an iPhone™ 4 device by Apple Inc., an image of the user may be conveniently captured using the front-facing camera, e.g., while at the same time the user sees herself in the display screen 12 by virtue of the digital viewfinder function executing off of the front-facing camera. The captured image is then examined at 34 to ensure that the subject's facial features have been adequately captured in the image. If not, the image capture process is repeated. Once the existence of facial features in the captured image has been verified, the controller 18 may signal some form of feedback to the camera user, letting the user know that the automated image capture process can continue.

Once an acceptable image of the subject's face has been captured, the automated picture taking process continues with monitoring image data from a camera, which may be a rear-facing camera, to determine if the face in the previously captured image appears in the camera's field of view (operation 36). For instance, a rapid sequence of images captured by the camera while the camera is aimed at a desired scene, are analyzed to detect when the subject has moved into the camera's field of view. This may be accomplished using suitable facial recognition software. Facial recognition algorithms with accuracy sufficient for the purposes of this invention are widely available. For example, facial recognition is included in the iPhoto™ application by Apple Inc., which uses facial detection to identify faces of people in photographs and facial recognition to match faces that look like the same person. When the subject has been recognized in the camera's field of view, a countdown may be initiated at 38 to give the photographer (camera user) and/or the subject additional time to compose the scene before a picture of the scene is taken. This may be implemented using a variable timer that may be set in advance by the photographer. The photographer and/or the subject may be alerted to the countdown with a sequence of beeps or light flashes. At the end of the countdown, the image is captured at 40, i.e. the picture is taken.

Figure 5:
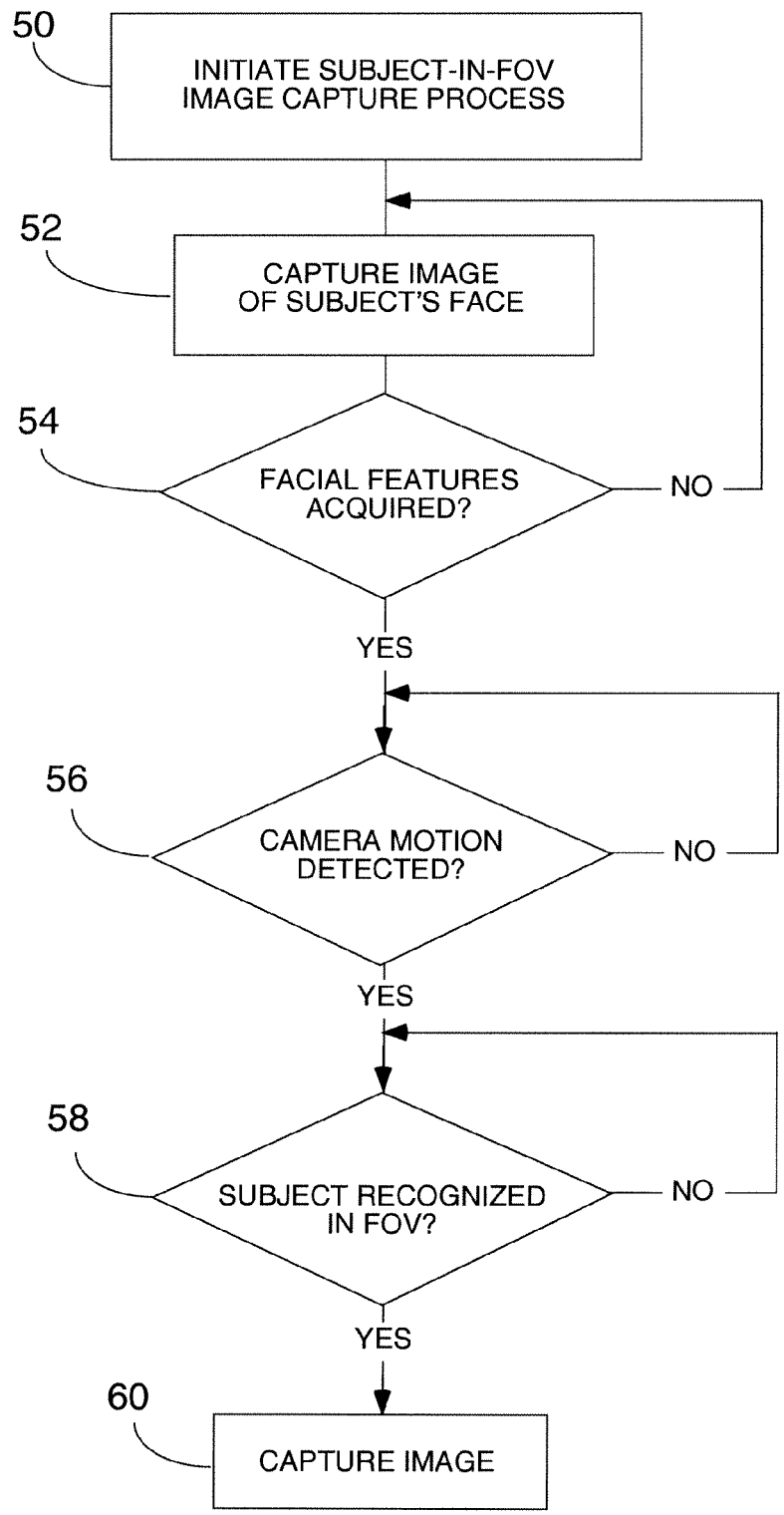
FIG. 5 is a functional flow diagram of an image capture process in accordance with another embodiment of the present invention.

An image capture process in accordance with another embodiment of the invention is shown in FIG. 5. This process is similar to the process previously described and is begun with an appropriate user selection at 50. The subject's image is captured at 52 and verified at 54 in the same manner described above. Unlike the previously described embodiment, the subsequent search for the subject's face within the camera's field of view is initiated manually by the camera user. For instance, if the device 10 has an accelerometer or other sensor that can detect movement of the device 10, the facial recognition search may be initiated by or in response to a sudden movement of the device, such as imparted by a simple flip of the camera user's hand, which is detected at 56. When such movement is detected, the process proceeds at 58 to search for the subject's face within the camera's field of view in the same manner as described above. The image is then captured at 60.

In accordance with another embodiment of the invention, a portable electronic device has a camera function implemented by a camera controller, to conduct a process for taking a picture of a scene. Once that process is initiated (e.g., through user input via a menu selection), the controller causes the capture of an image of a subject and then analyzes the image to detect facial features of the subject therein. Next, after the presence of facial features has been confirmed, the controller causes the capture of several images of the scene (e.g., a continuous shooting sequence), and then analyzes these scene images using facial recognition to detect the subject's face therein. In particular, the previously captured image of the subject may be analyzed to extract certain facial features from it, and these are then compared using a facial recognition algorithm to facial features extracted from the scene images, until a match is detected. This means that the subject has now moved into the scene. In response, the controller causes a subsequent capture of an image of the scene, which is then stored in the device as the desired picture.

The camera function may use a single image sensor array to which the controller is coupled, to cause the capture of all of the images during the picture taking process. Alternatively, multiple sensor arrays may be used, e.g. a first image sensor array to to capture the subject's image, and a second, different image sensor array to capture the scene images and the subsequent scene image. In one embodiment, the first and second sensor arrays are aimed in substantially opposite directions.

The camera controller may be programmed to signal an alert to a user of the device in response to having detected facial features of the subject in the subject's image. This alert may be text on a display screen of the device, indicating to the user that the subject should now move into the scene for the picture taking process to continue.

The camera controller may also be programmed to begin a countdown in response to having detected the subject's face. Upon finishing the countdown, it signals the subsequent capture of an image of the scene, where at this point the scene has most likely been finalized and the subject is likely present in the scene.

In one embodiment, the controller can conduct the entire picture taking process without any user input, once the process has been initiated. In other embodiments, the controller can prompt the user before taking action. For instance, the user may be prompted to accept the detected facial features of the subject, before the controller signals the capture of the sequence of scene images. In yet another embodiment, once the controller signals that the scene images are to be capture, it automatically begins to analyze these scene images as they are being produced (without user input being required) and then automatically begins the countdown once the subject's face has been detected.

In yet another embodiment, the device has a motion sensor to which the controller is coupled to sense movement of the device. The controller is to analyze the scene images using facial recognition, to detect the subject's face therein, upon sensing movement of the device (e.g., the device being flipped or rotated.)

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM, volatile RAM, non-volatile memory, cache, or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

A machine readable medium can be used to store software and data which when executed by the data processing system causes the system to perform various methods of the present invention. This executable software and data may be stored in various places including for example ROM, volatile RAM, non-volatile memory, and/or cache. Portions of this software and/or data may be stored in any one of these storage devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium. A machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with a variety of data processing systems. For example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order that is different from the order described herein. The operations may be embodied in machine-executable instructions that cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow as well as the legal equivalents thereof.

What is claimed is:

1. In a portable electronic device having first and second cameras on opposing sides of the device, a method comprising automating image capture by the first camera, the automated image capture triggered by detection of an image in the first camera's field of view matching an image previously captured by the second camera.

2. The method of claim 1 wherein the image captured by the second camera comprises an image of a human face.

3. The method of claim 2 wherein detection of an image in the first camera's field of view matching an image previously captured by the second camera utilizes facial recognition.

4. The method of claim 1 wherein the first camera is a rear-facing camera and the second camera is a front-facing camera.

5. A portable electronic device having a camera function, comprising:
a camera controller to conduct a process for taking a picture of a scene, in which the controller causes capture of an image of a subject through a first sensor array and then analyzes the image to detect facial features of the subject therein, causes capture of a plurality of images of the scene images through a second sensor array and then analyzes the scene using facial recognition to detect the subject's face therein and in response causes a subsequent capture of an image of the scene through the second sensor array to be stored in the device as said picture.

6. The portable electronic device of claim 5 further comprising an image sensor array to which the controller is coupled to cause the capture of all of said images.

7. The portable electronic device of claim 5 wherein the camera controller is to signal an alert to a user of the device in response to having detected facial features of the subject in the subject's image, wherein the alert indicates to the user that the subject may now move into the scene.

8. The portable electronic device of claim 5 wherein the camera controller begins a countdown in response to having detected the subject's face, and upon finishing the countdown signals the subsequent capture of an image of the scene.

9. The portable electronic device of claim 5 wherein the controller is to conduct said picture taking process without any user input, once the process has been initiated.

10. An article of manufacturing comprising:
a non-transitory machine-readable storage medium having stored therein instructions that program a processor, the processor being a component of a portable electronic device having a camera, to cause a capture of an image of a subject through a front-facing camera, to analyze a facial feature of the subject in the captured image, and to monitor subsequent image data through a rear-facing camera to determine when the subject appears in the image data, and to cause a subsequent capture of an image of a scene through the rear-facing camera in response to the subject appearing in the image data.

11. The article of manufacture of claim 10 wherein the front-facing camera has an imaging lens disposed on the same surface of the device as a digital viewfinder.

12. The article of manufacture of claim 11 wherein the rear-facing camera has an imaging lens disposed on the opposing surface of the device as the digital viewfinder.

13. The article of manufacture of claim 10 wherein the machine-readable storage medium contains additional instructions that program the processor to initiate monitoring of the subsequent image data in response to verifying the existence of facial features in the captured image.

14. The article of manufacture of claim 10 wherein the machine-readable storage medium contains additional instructions that program the processor to start a countdown when the subject has been recognized in the subsequent image data, signal an alert for the countdown, and at the end of the countdown cause the subsequent capture.

* * * * *